(12) United States Patent
Yamaguchi et al.

(10) Patent No.: US 8,134,191 B2
(45) Date of Patent: Mar. 13, 2012

(54) SOLID-STATE IMAGING DEVICE, SIGNAL PROCESSING METHOD, AND CAMERA

(75) Inventors: Takumi Yamaguchi, Kyoto (JP); Yuuichi Inaba, Toyama (JP); Daisuke Ueda, Osaka (JP); Yoshiyuki Matsunaga, Kyoto (JP)

(73) Assignee: Panasonic Corporation, Osaka (JP)

( * ) Notice: Subject to any disclaimer, the term of this patent is extended or adjusted under 35 U.S.C. 154(b) by 677 days.

(21) Appl. No.: 12/160,291

(22) PCT Filed: Jul. 11, 2006

(86) PCT No.: PCT/JP2006/313711
§ 371 (c)(1),
(2), (4) Date: Jul. 8, 2008

(87) PCT Pub. No.: WO2007/086155
PCT Pub. Date: Aug. 2, 2007

(65) Prior Publication Data
US 2009/0009621 A1    Jan. 8, 2009

(30) Foreign Application Priority Data

Jan. 24, 2006  (JP) .................................. 2006-015660

(51) Int. Cl.
*H01L 31/09* (2006.01)
(52) U.S. Cl. .......................... 257/294; 257/291; 257/432
(58) Field of Classification Search .................. 257/294, 257/291, 432
See application file for complete search history.

(56) References Cited

U.S. PATENT DOCUMENTS

| | | | | |
|---|---|---|---|---|
| 6,104,431 A | * | 8/2000 | Inoue et al. | 348/333.01 |
| 6,803,955 B1 | * | 10/2004 | Yosida | 348/272 |
| 2005/0133690 A1 | | 6/2005 | Higashitsutsumi | |
| 2005/0143652 A1 | * | 6/2005 | Sato | 600/431 |
| 2006/0124833 A1 | * | 6/2006 | Toda | 250/214 R |
| 2006/0186322 A1 | * | 8/2006 | Matsuyama | 250/226 |
| 2008/0079828 A1 | * | 4/2008 | Izawa | 348/294 |
| 2009/0002531 A1 | * | 1/2009 | Godaiin | 348/294 |

FOREIGN PATENT DOCUMENTS

| | | |
|---|---|---|
| JP | 5-15085 | 1/1993 |
| JP | 2000-59798 | 2/2000 |
| JP | 2002-142228 | 5/2002 |
| JP | 2004-228662 A | 8/2004 |

(Continued)

*Primary Examiner* — Howard Weiss
*Assistant Examiner* — Tifney Skyles
(74) *Attorney, Agent, or Firm* — McDermott Will & Emery LLP

(57) ABSTRACT

A solid-state imaging apparatus that performs color imaging using visible light and imaging using infrared light, the solid-state imaging apparatus including a plurality of two-dimensionally arranged pixel cells, in each of which a filter mainly transmits one of visible light and infrared light, wherein filters are arranged such that a first unit of arrangement where a plurality of filters that mainly transmit visible light are arranged and a second unit of arrangement where a filter that mainly transmits visible light and a filter that mainly transmits infrared light are arranged are alternately arranged in both a row direction and a column direction. Also, in the first unit of arrangement are arranged filters including three kinds of filters each transmitting one of red light, green light and blue light and in the second unit of arrangement are arranged four kinds of filters each transmitting one of red light, green light, blue light and infrared light.

15 Claims, 11 Drawing Sheets

FOREIGN PATENT DOCUMENTS

| | | |
|---|---|---|
| JP | 2005-6066 | 1/2005 |
| JP | 2005-184690 | 7/2005 |
| JP | 2005-191748 | 7/2005 |
| JP | 2006-6922 | 1/2006 |
| JP | 2006-148690 | 6/2006 |

\* cited by examiner

SOLID-STATE IMAGING DEVICE, SIGNAL PROCESSING METHOD, AND CAMERA

RELATED APPLICATIONS

This application is the U.S. National Phase under 35 U.S.C. §371 of International Application No. PCT/JP2006/313711, filed on Jul. 11, 2006, which in turn claims the benefit of Japanese Application No. 2006-015660, filed on Jan. 24, 2006, the disclosures of which Applications are incorporated by reference herein.

BACKGROUND OF THE INVENTION

The present invention relates to a solid-state imaging apparatus, a signal processing method and, a camera, and particularly to technology that performs both color imaging using visible light and imaging using infrared light at high resolution.

Conventionally, a solid-state imaging apparatus used for a digital still camera and a digital video camera obtains a color image using three primary color filters (a red filter, a green filter and a blue filter) or four complementary color filters (a cyan filter, a magenta filter, a yellow filter and a green filter).

When incident light that has passed through a filter is received by a photodiode, the photodiode receives light in a wavelength region (around 380 nm to 1100 nm) which is wider than the visible region of humans (around 380 nm to 780 nm) to generate signal charge. This gives an error of infrared light, deteriorating color reproducibility. Thus, it is common to remove infrared light in advance using an infrared cut filter (herein after, "IR cut filter"). However, the IR cut filter decreases visible light by about 10 to 20 percent, which deteriorates the sensitivity of a solid-state imaging apparatus, degrading an image quality.

In order to solve the above problem, recently, a solid-state imaging apparatus in which no IR cut filter has been proposed (see Patent Document 1). FIG. 1 is a circuit diagram showing a main structure of a solid-state imaging apparatus that pertains to conventional technology and that detects infrared light in addition to visible light.

As shown in FIG. 1, a solid-state imaging apparatus 11 includes pixels 1101, a vertical shift register 1102, vertical signal lines 1103, row memories 1104, a horizontal shift register 1105, a horizontal signal line 1106 and an output amplifier 1107. Each of the pixels 1101 has an individual filter. Filters are arranged such that units of arrangement, in each of which four filters are squarely arranged like a unit of arrangement 1108, are two-dimensionally arranged. Here, the four filters are a filter that mainly transmits red light (herein after, "red filter") (R), a filter that mainly transmits green light (herein after, "green filter") (G), a filter that mainly transmits blue light (herein after, "blue filter") (B) and a filter that mainly transmits infrared light (herein after, "infrared filter") (IR).

The pixels 1101 selected by the vertical shift register 1102 transfer pixel signals to the row memories 1104 via the vertical signal lines 1103. After the pixel signals stored in the row memories 1104 are selected one at a time by the horizontal shift register 1105, the pixel signals pass through the horizontal signal line 1106, are amplified in the output amplifier 1107 and then are outputted.

Then, the output signals of the pixels 1101 that have received red light, green light and blue light are corrected using the output signals of the pixels 1101 that have received infrared light.

Thus, it is possible to achieve high color reproducibility without using the IR filter.

Patent Document 1: Japanese Laid-open publication No. 2005-184690
Patent Document 2: Japanese Laid-open publication No. 2002-142228
Patent Document 3: Japanese Laid-open publication No. 2000-059798

However, according to the solid-state imaging apparatus 11, a row where as much as half of the pixels detect infrared light is in every other row. Also, a column where as much as half of the pixels detect infrared light is in every other column. Therefore, information about visible light is insufficient in rows and columns where the number of pixels that detect infrared light is large, deteriorating resolution.

In order to solve such problem, for example, it is possible to prevent information about visible light from being insufficient, using a filter that transmits light in a predetermined wavelength region in addition to infrared light like a solid-state imaging apparatus disclosed in Patent Document 2.

However, it is necessary to laminate a plurality of filters in order to obtain a filter disclosed in Patent Document 2, which prevents a solid-state imaging apparatus from being downsized and also is against a request for increasing a pixel count. Also, complex operations are needed for obtaining a pixel signal of each three of the primary colors, making the solid-state imaging apparatus impractical.

Also, it is needless to say that it is desirable that such solid-state imaging apparatus is able to perform both color imaging using visible light and imaging using infrared light. Also, it is needless to say that it is desirable that both color imaging and imaging are performed at high resolution. However, according to a solid-state imaging apparatus disclosed in Patent Document 3, for example, since filters are switched each time (i.e. in performing color imaging using visible light and in performing imaging using infrared light), it is not possible to perform both color imaging and imaging at the same time.

SUMMARY OF THE INVENTION

The present invention, which arose in view of the above problem, has an objective to provide a solid-state imaging apparatus that is capable of performing color imaging using visible light and imaging using infrared light at the same time at high resolution and that is also compact and has a high pixel count, a signal processing method for such solid-state imaging apparatus and a camera having such solid-state imaging apparatus.

To achieve the above objective, the solid-state imaging apparatus pertaining to the present invention is a solid-state imaging apparatus that performs color imaging using visible light and imaging using infrared light, the solid-state imaging apparatus including a plurality of two-dimensionally arranged pixel cells, in each of which a filter mainly transmits one of visible light and infrared light, wherein arrangement of the filters is a combination of (i) a first unit of arrangement where a plurality of filters that mainly transmit visible light are arranged and (ii) a second unit of arrangement where a filter that mainly transmits visible light and a filter that mainly transmits infrared light are arranged.

Thus, it is possible to (i) perform color imaging using visible light and imaging using infrared light at the same time at high resolution, (ii) reduce the number of pixel cells that detect the amount of infrared light to prevent the deterioration in resolution at the time of performing color imaging using visible light, and (iii) downsize a solid-state imaging apparatus and increase a pixel count.

Note that the filter that mainly transmits infrared light is a filter whose transmittance in a wavelength region of visible light is 30% or less at any wavelength and is capable of transmitting infrared light. In this case, according to the filters that mainly transmit visible light, the transmittance of visible light such as red light, green light and blue light in predetermined wavelength regions is 30% or more.

In this case, in the first unit of arrangement, filters that include three kinds of filters each mainly transmitting one of red, green and blue light may be arranged, and in the second unit of arrangement, four kinds of filters each mainly transmitting one of red light, green light, blue light and infrared light may be arranged. Also, in the first unit of arrangement, one filter that mainly transmits red light, one filter that mainly transmits blue light and two filters that mainly transmit green light may be squarely arranged, the two filters that mainly transmit green light being arranged so as to oppose each other in a diagonal direction, and in the second unit of arrangement, one each of the four kinds of filters may be squarely arranged.

The solid-state imaging apparatus pertaining to the present invention is a solid-state imaging apparatus that performs color imaging using visible light and imaging using infrared light, the solid-state imaging apparatus including a plurality of two-dimensionally arranged pixel cells, in each of which a filter mainly transmits one of visible light and infrared light, wherein the filters are arranged such that units of arrangement, each of which has filters including at least a filter that mainly transmits green visible light and a filter that mainly transmits infrared light, are two-dimensionally arranged, and the filter that mainly transmits green visible light and the filter that mainly transmits infrared light are adjacent to each other in one of a row direction and a column direction.

Green is higher in spectral luminous efficiency than red and blue. Accordingly, by arranging a pixel cell that detects green light adjacent to a pixel cell that detects infrared light, it is possible to make unnoticeable, in obtaining a color image using visible light, the loss of a pixel signal in a pixel cell portion that detects infrared light. Therefore, it is possible to prevent the deterioration in resolution.

The solid-state imaging apparatus pertaining to the present invention is a solid-state imaging apparatus that performs color imaging using visible light and imaging using infrared light, the solid-state imaging apparatus including a plurality of two-dimensionally arranged pixel cells, in each of which a filter mainly transmits one of visible light and infrared light, wherein the filters are arranged such that units of arrangement, in each of which a plurality of kinds of filters that mainly transmit one of visible light and infrared light are one dimensionally arranged, are two-dimensionally arranged, and filters that mainly transmit infrared light are not adjacent to each other either in a row direction or in a column direction.

Thus, it is possible to disperse pixels that lack pixel signals due to the presence of the pixel cells that detect infrared light. Accordingly, it is possible to suppress the deterioration in resolution in performing color imaging using visible light.

According to the solid-state imaging apparatus pertaining to the present invention, the filters that mainly transmit infrared light are not adjacent to each other in a diagonal direction.

Thus, it is possible to avoid arranging, in every two pixels in the same row or in the same column, the filter that mainly transmits infrared light. Therefore, it is possible to prevent the deterioration in resolution in performing color imaging using visible light.

Also, in the units of arrangement, four kinds of filters that mainly transmit one of red light, green light, blue light and infrared light are arranged. Also, in the units of arrangement, five kinds of filters that mainly transmit one of cyan light, magenta light, yellow light, green light and infrared light may be arranged.

The solid-state imaging apparatus pertaining to the present invention is a solid-state imaging apparatus that performs color imaging using visible light and imaging using infrared light, the solid-state imaging apparatus including a plurality of two-dimensionally arranged pixel cells, in each of which a filter mainly transmits one of visible light and infrared light, wherein arrangement of the filters is a combination of (i) a first unit of arrangement where filters including at least a filter that mainly transmits green visible light and a filter that mainly transmits infrared light are squarely arranged and (ii) a second unit of arrangement where filters including at least a filter that mainly transmits green visible light and a filter that mainly transmits infrared light are arranged differently from the first unit of arrangement.

Thus, it is possible to avoid arranging, in every two pixels both in a row direction and in a column direction, a pixel cell that detects infrared light. Accordingly, it is possible to prevent the deterioration in resolution in performing color imaging using visible light. Also, since the pixel cells that detect infrared light are included both in the first unit of arrangement and in the second unit of arrangement, it is possible to enhance the resolution in performing imaging using infrared light.

Also, the filter that mainly transmits green light and the filter that mainly transmits infrared light may be adjacent to each other in the row direction or in the column direction. In this way, it is possible to obtain an image signal in each wavelength region without undergoing complex operations. Also, it is possible to enhance the resolution both in performing color imaging using visible light and in performing imaging using infrared light.

According to the solid-state imaging apparatus pertaining to the present invention, a multilayer interface filter that composes each of the filters that mainly transmit visible light includes two $\lambda/4$ multilayer films and a dielectric layer sandwiched there between, the dielectric layer having an optical film thickness different from an optical film thickness of each layer that composes the $\lambda/4$ multilayer films, wherein each of (i) the two $\lambda/4$ multilayer films that are included in each of the filters that mainly transmits visible light and (ii) a $\lambda/4$ multilayer film that composes the filter that mainly transmits infrared light includes two types of dielectric layers that have been alternately laminated, each type of dielectric layers being composed of inorganic materials, and having a same optical thickness and a different refractive index from each other. Thus, it is possible to downsize the solid-state imaging apparatus and increase a pixel count.

The camera pertaining to the present invention has the solid-state imaging apparatus pertaining to the present invention. Thus, it is possible to perform both color imaging using visible light and imaging using infrared light at the same time at high resolution. Also, it is possible to downsize a solid-state imaging apparatus and increase a pixel count.

A signal processing method pertaining to the present invention is a signal processing method used in a solid-state imaging apparatus that performs color imaging using visible light and imaging using infrared light, the solid-state imaging apparatus including (i) a color pixel cell which is a pixel cell having a filter that transmits both visible light and infrared light together and (ii) an infrared pixel cell which is a pixel cell having a filter that mainly transmits infrared light, the signal processing method comprising steps of outputting a color pixel signal which is a pixel signal that indicates, for each color pixel cell, an amount of received light, outputting an infrared pixel signal which is a pixel signal that indicates, for each infrared pixel cell, an amount of received light, and obtaining a color pixel signal by subtracting, for each color pixel cell, the infrared pixel signal outputted by the infrared pixel cell from the color pixel signal.

Thus, it is possible to obtain an image signal at each wavelength using only simple subtraction. In this case, it is even more preferable that (i) the color pixel cells are a plurality of kinds of color pixel cells having filters that transmit one of the plurality of kinds of visible light and infrared light together, (ii) units of arrangement, in each of which the plurality of kinds of color pixel cells and the infrared pixel cell are arranged, are two-dimensionally arranged and (iii) the infrared pixel cell signal outputted by the infrared pixel cell that belongs to the same unit of arrangement as the color pixel cells is subtracted from the color pixel signal.

BRIEF DESCRIPTION OF THE DRAWINGS

FIG. 8A, FIG. 8B, FIG. 8C and FIG. 8D show a structure of a filter (B+IR), a structure of a filter (R+IR), a structure of filters (G1+IR) and (G2+IR), and a structure of an infrared filter, respectively;

FIG. 9A, FIG. 9B, FIG. 9C and FIG. 9D show characteristics of the filters (R+IR), (G+IR), (B+IR) and the infrared filter (IR), respectively;

DESCRIPTION OF THE PREFERRED EMBODIMENT

The following description is given of embodiments of a solid-state imaging apparatus, a signal processing method and a digital camera that pertain to the present invention, taking the example of a digital camera with reference to the drawings.

1. First Embodiment

A digital camera pertaining to the present embodiment is characterized by its arrangement of filters provided in the solid-state imaging apparatus.

(1) Structure of the Digital Camera

Figure 1:
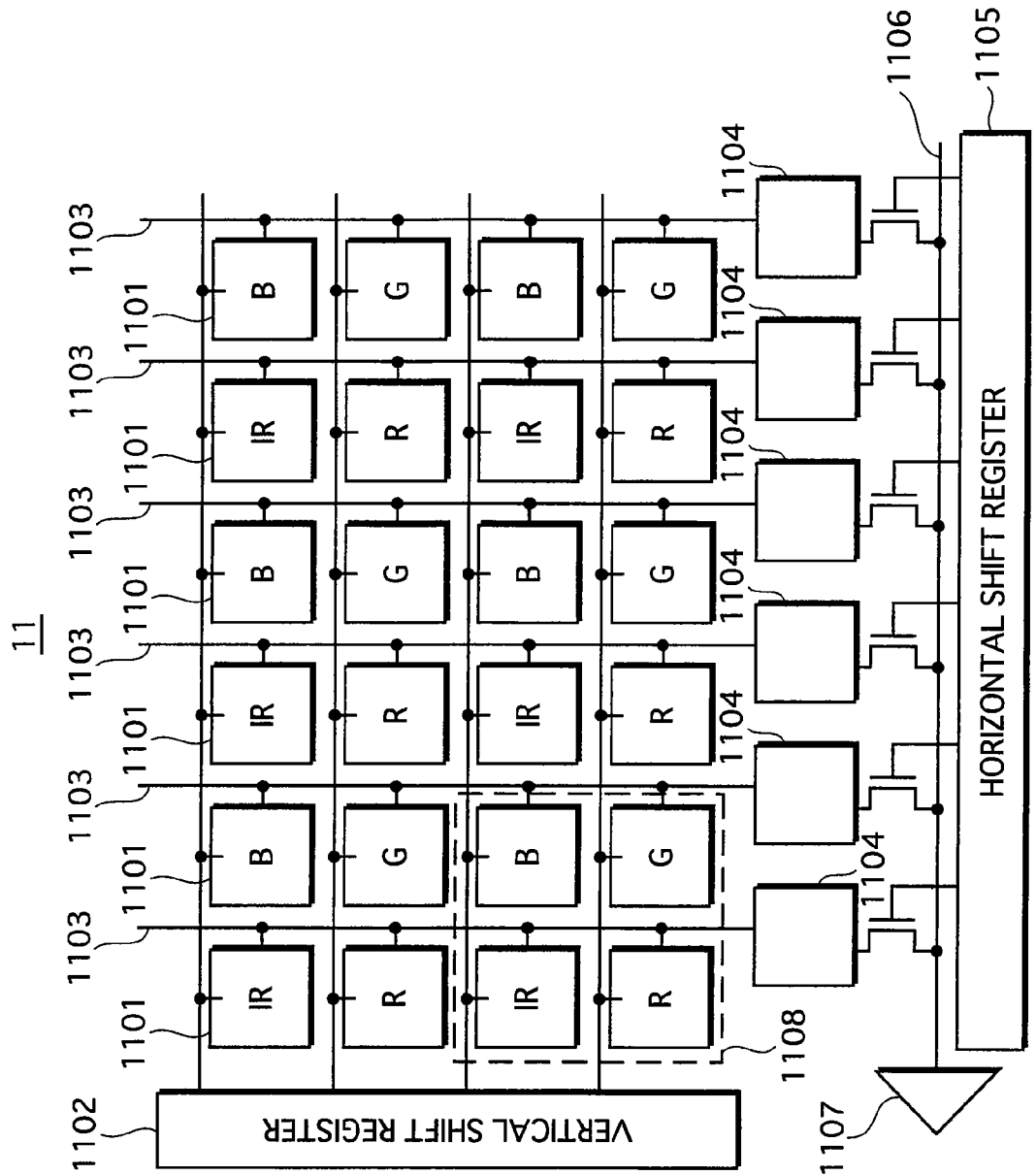
FIG. 1 is a circuit diagram showing a main structure of a solid-state imaging apparatus that pertains to conventional technology and that detects infrared light in addition to visible light.
Figure 2:
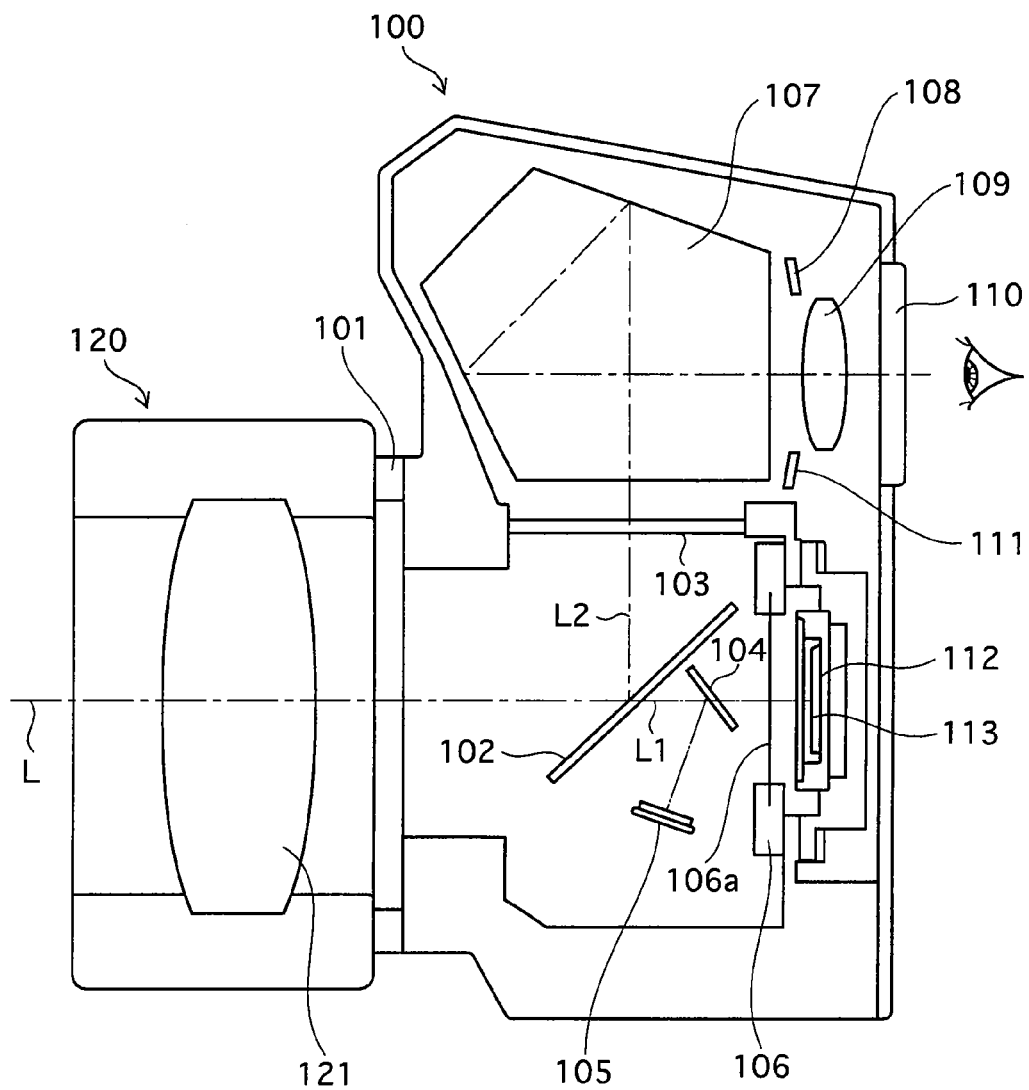
FIG. 2 is a sectional view showing a main structure of a digital camera pertaining to a first embodiment of the present invention.

Firstly, the structure of the digital camera pertaining to the present embodiment is described. FIG. 2 is a sectional view showing the main structure of the digital camera pertaining to the present embodiment. As shown in FIG. 2, a digital camera 100 includes a lens mount 101, a quick return mirror 102, a finder screen 103, a submirror 104, a focal point detecting sensor 105, a shutter unit 106, a pentaprism 107, a photometry sensor 108, an ocular lens 109, an ocular window 110, a calorimetric sensor 111, a solid-state imaging apparatus 112 and a cover glass 113.

An exchange lens 120 having a lens 121 is mounted on the lens mount 101.

An object luminous flux L is incident on the quick return mirror 102 via the exchange lens 121. The translucent quick return mirror 102 divides object luminous flux L into transmitted light L1 and reflected light L2. The transmitted light L1 is used for an auto focus and the reflected light L2 is used for a finder observation.

The reflected light L2 forms an object image on the finder screen 103. This object image is observed from the finder ocular window 110 after passing through the pentaprism 107 and the ocular lens 109. Also, a part of light that has passed through the pentaprism 107 is led by the photometry sensor 108 and the calorimetric sensor 111.

The transmitted light L1 is reflected by the submirror 104 and is led by the focal point detecting sensor 105.

The shutter unit 106, the cover glass 113 and the solid-state imaging apparatus 112 are provided on the optical axis of the lens 121 behind the quick return mirror 102. The cover glass 113 protects the solid-state imaging apparatus 112.

The push of a shutter button (not shown in the figure) of the digital camera 100 causes the quick return mirror 102 to spring up out of an optical path of the object luminous flux L, which opens and closes a shutter film 106a of the shutter unit 106, exposing the solid-state imaging apparatus 112.

(2) Structure of the Solid-State Imaging Apparatus 112

The structure of the solid-state imaging apparatus 112 included in the digital camera 100 is described next. Although the solid-state imaging apparatus 112 has almost the same structure as the solid-state imaging apparatus 11 pertaining to the prior art, the arrangement of filters is different. The following description is given of the difference entirely.

Figure 3:
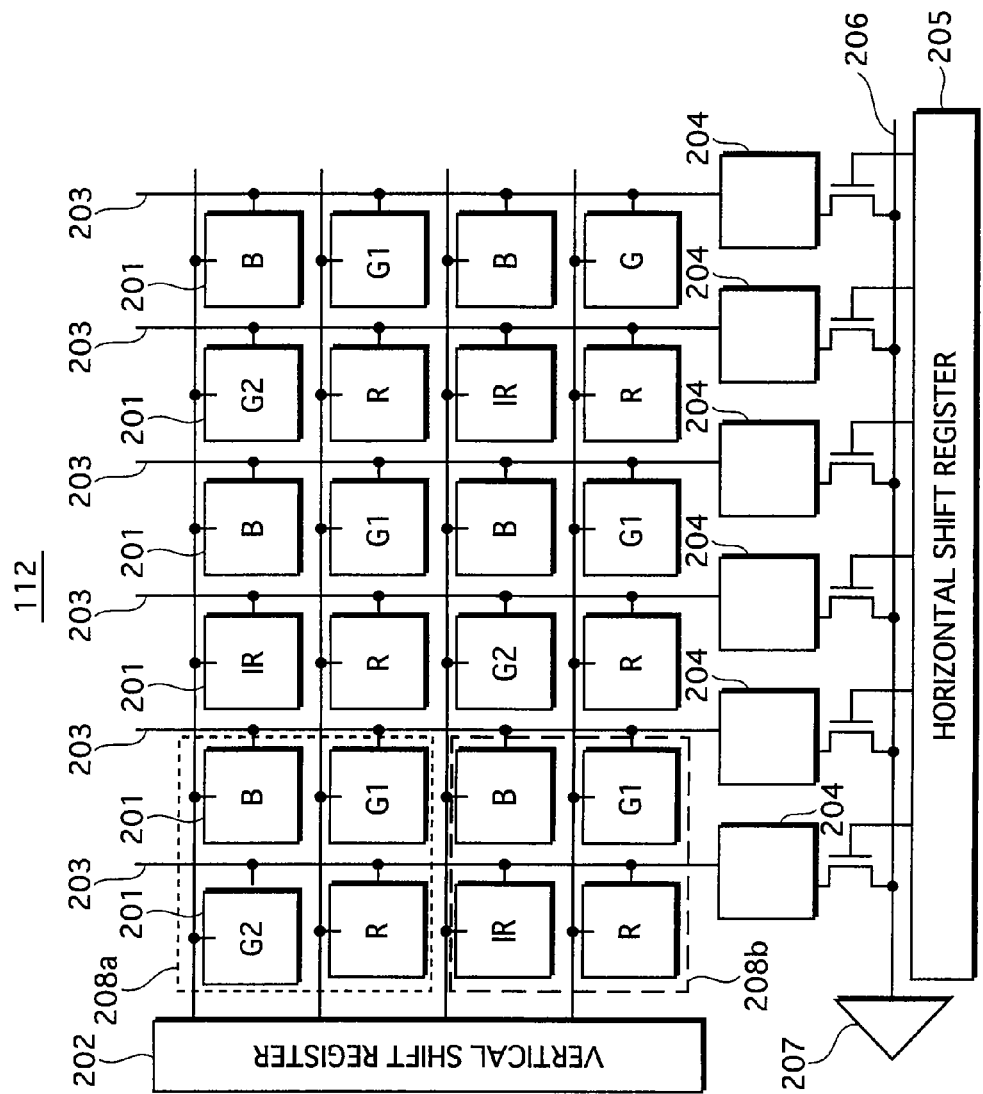
FIG. 3 is a circuit diagram showing a main structure of a solid-state imaging apparatus 112 pertaining to the first embodiment of the present invention.

FIG. 3 is a circuit diagram showing the main structure of the solid-state imaging apparatus 112. As shown in FIG. 3, the solid-state imaging apparatus 112 includes pixels 201, a vertical shift register 202, vertical signal lines 203, row memories 204, a horizontal shift register 205, a horizontal signal line 206 and an output amplifier 207.

In the above prior art, four kinds of filters (the red filter (R), the green filter (G), the blue filter (B) and the infrared filter (IR)) that mainly transmit light in four wavelength regions are squarely arranged as the unit of arrangement 1108. However, two kinds of units of arrangement are used in the present embodiment.

That is used are a unit of arrangement 208a where four kinds of filters (a red filter (R), green filters (G1, G2) and a blue filter (B)) are squarely arranged and a unit of arrangement 208*b* where four kinds of filters (a red filter (R), a green filter (G1), a blue filter (B) and an infrared filter (IR)) are squarely arranged. Also, the units of arrangement 208*a* and 208*b* are arranged alternately both in the row direction and in the column direction.

Thus, the number of pixels 201 that receive infrared light is decreased and the number of pixels 201 that receive green light is increased compared to the solid-state imaging apparatus 11 pertaining to the prior art. Therefore, it is possible to greatly enhance the resolution in performing color imaging using visible light. Also, it is possible to perform color imaging using visible light and imaging using infrared light in parallel.

[2] Second Embodiment

Next, the second embodiment of the present invention is described. Although a digital camera pertaining to the present embodiment has almost the same structure as the digital camera pertaining to the above first embodiment, the arrangement of filters is different. The following description focuses on the difference.

Figure 4:
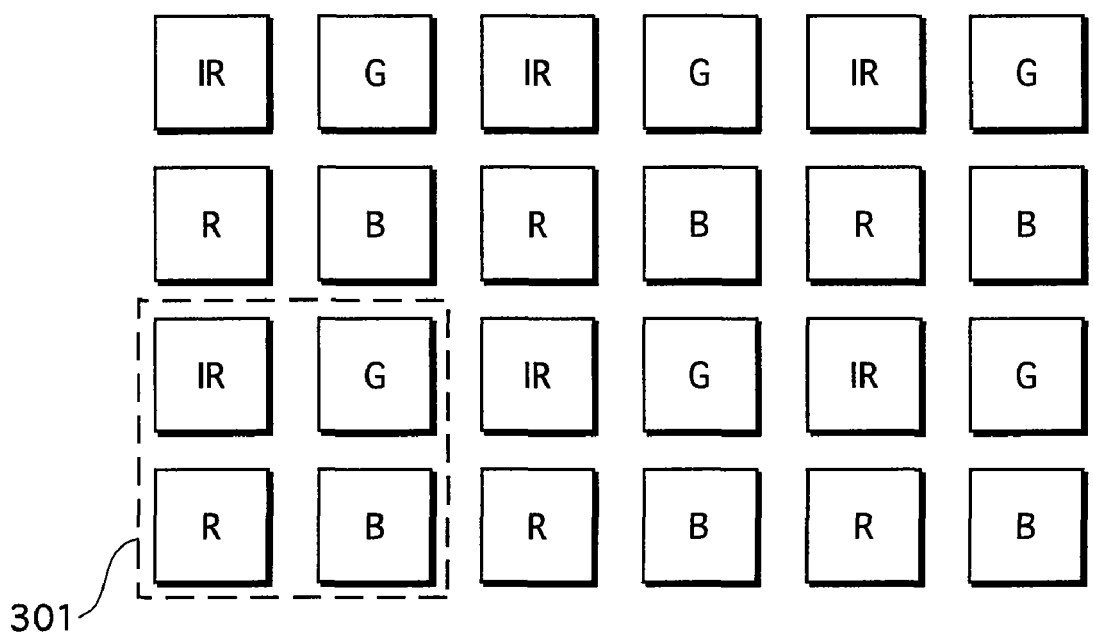
FIG. 4 shows an arrangement of filters of a solid-state imaging apparatus pertaining to a second embodiment of the present invention.

FIG. 4 is a diagram showing the arrangement of filters of a solid-state imaging apparatus pertaining to the present embodiment. As shown in FIG. 4, according to the solid-state imaging apparatus 3, four filters (a red filter (R), a green filter (G), a blue filter (B) and an infrared filter (IR)) are squarely arranged in a unit of arrangement 301. Also, the green filter and the infrared filter are arranged adjacent to each other in the row direction in the unit of arrangement 301. Thus, in the solid-state imaging apparatus 3 overall, the green filter (G) and the infrared filter (IR) are arranged adjacent to each other.

Green is higher in spectral luminous efficiency than red and blue. Therefore, it is possible to make unnoticeable, in performing the color imaging using visible light, the loss of a pixel signal in an infrared filter portion if the green filter is arranged adjacent to the infrared filter. Thus, it is possible to prevent the deterioration in resolution.

[3] Third Embodiment

The third embodiment of the present invention is described next. Although a digital camera pertaining to the present embodiment has almost the same structure as the digital camera pertaining to the above first embodiment, the arrangement of filters is different. The following description focuses on the difference.

Figure 5:
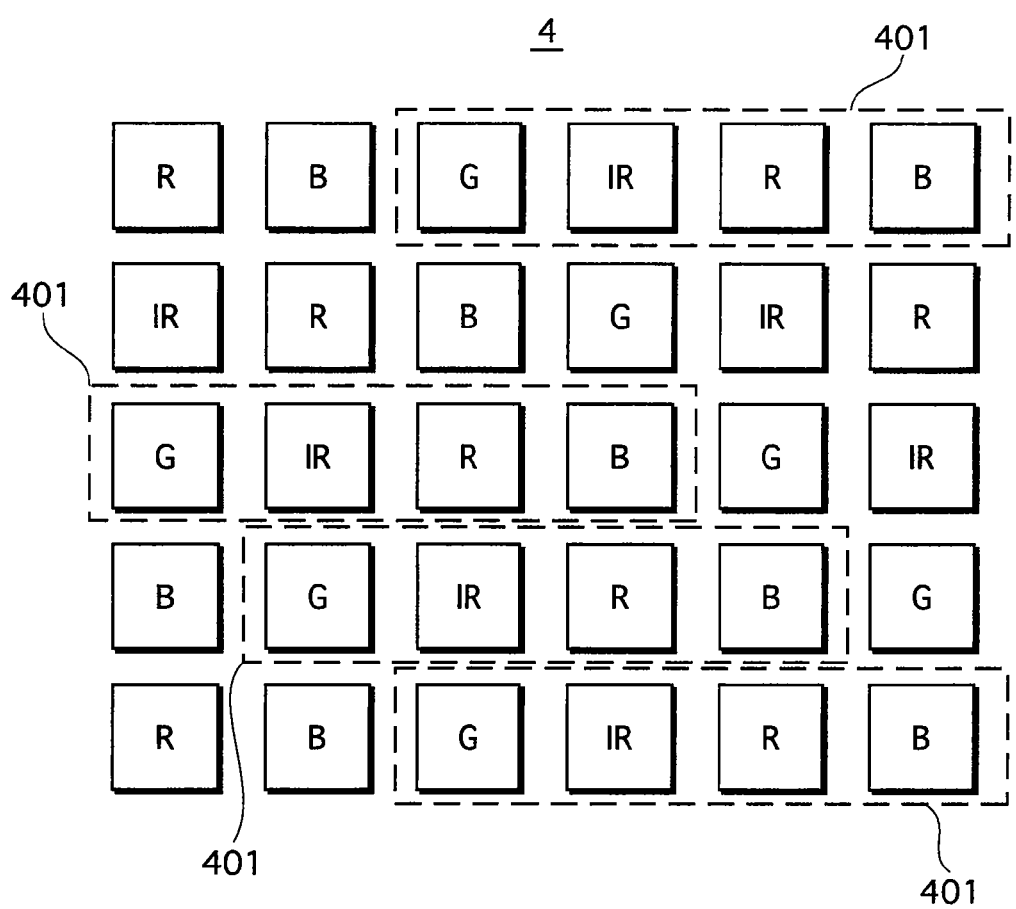
FIG. 5 shows an arrangement of filters of a solid-state imaging apparatus pertaining to a third embodiment of the present invention.

FIG. 5 shows the arrangement of filters of a solid-state imaging apparatus pertaining to the present embodiment. As shown in FIG. 5, a solid-state imaging apparatus 4 includes filters that are arranged such that units of arrangement 401, in each of which a blue filter (B), an infrared filter (IR), a red filter (R) and a green filter (G) are one-dimensionally arranged sequentially in the row direction, are two-dimensionally arranged.

In this case, the units of arrangement that are adjacent to each other in the column direction are arranged such that the units of arrangement are displaced one pixel from each other in the row direction. Thus it is possible to avoid arranging the infrared filters adjacent to each other in the column direction.

Thus, an infrared filter is arranged in every four pixels both in the row direction and in the column direction, preventing the deterioration in resolution in performing color imaging using visible light.

Also, in a unit of arrangement 401, since the infrared filter is adjacent to the green filter, the infrared filter is also adjacent to the green filter in the column direction. Thus, since green is high in spectral luminous efficiency, it is possible to make unnoticeable the loss of the pixel signal in the infrared filter portion in performing color imaging using visible light. Consequently, it is possible to prevent the deterioration in resolution.

Also, an infrared filter is neither arranged in every other pixel cell in one column of pixel cells nor arranged in every other pixel cell in one row of pixel cells. Thus, it is possible to prevent the deterioration in resolution.

Also, even if arrangements of units are square arrangements, it is possible to two-dimensionally arrange the units of arrangement such that the units of arrangement that are adjacent to each other in the column direction are displaced one pixel from each other in the row direction. Thus, an infrared filter is arranged in every four pixels in the column direction, which suppresses the deterioration in resolution.

However, in the row direction, an infrared filter is arranged in every two pixels. Therefore, it is not possible to suppress the deterioration in resolution. However, in the present embodiment, since an infrared filter is arranged in every four pixels in the row direction, it is possible to suppress the deterioration in resolution more, making it possible to realize even better image quality.

[4] Fourth Embodiment

The fourth embodiment of the present invention is described next. Although a digital camera pertaining to the present embodiment has almost the same structure as the digital camera pertaining to the above first embodiment, the arrangement of filters is different. The following description focuses on the difference.

Figure 6:
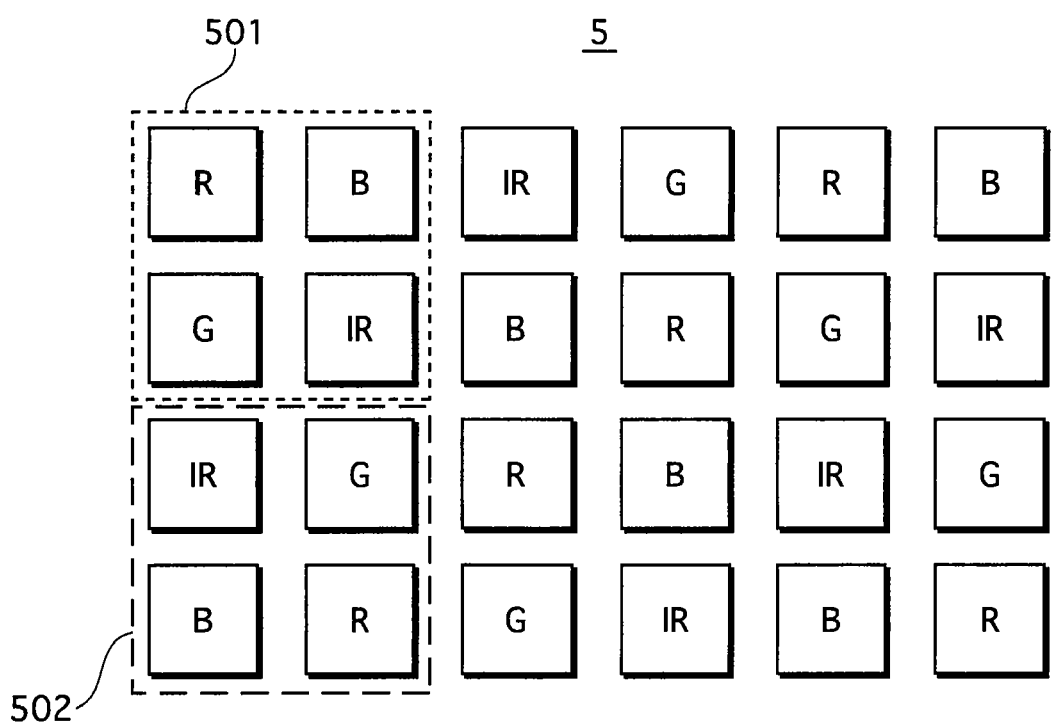
FIG. 6 shows an arrangement of filters of a solid-state imaging apparatus pertaining to a fourth embodiment of the present invention.

FIG. 6 shows the arrangement of filters of a solid-state imaging apparatus pertaining to the present embodiment. As shown in FIG. 6, the filters of a solid-state imaging apparatus 5 are arranged such that units of arrangement 501 and 502, in each of which a red filter (R), a blue filter (B), an infrared filter (IR) and a green filter (G) are squarely arranged, are two-dimensionally arranged alternately both in the row direction and in the column direction.

Also, the four filters are arranged in each of the units of arrangement 501 and 502 such that the filters of each of the units of arrangement are arranged differently from each other. That is filters are arranged in the order of the infrared filter, the green filter, the red filter and the blue filter from lower-right in a clockwise direction in the unit of arrangement 501 in FIG. 6. Also, filters are arranged in the order of the infrared filter, the green filter, the red filter and the blue filter from top-left in the clockwise direction in the unit of arrangement 502 in FIG. 6. As a result, the infrared filter is arranged adjacent to the green filter.

Thus, an infrared filter is arranged in every four pixels both in the row direction and in the column direction. Also, the green filter that mainly transmits green light that is high in spectral luminous efficiency is adjacent to the infrared filter. Accordingly, it is possible to suppress the deterioration in resolution.

[5] Fifth Embodiment

The fifth embodiment of the present invention is described next. Although a digital camera pertaining to the present embodiment has almost the same structure as the digital camera pertaining to the above first embodiment, the characteristics of filters and arrangement thereof are different. The following description focuses on the difference.

(1) Arrangement of Filters

Figure 7:
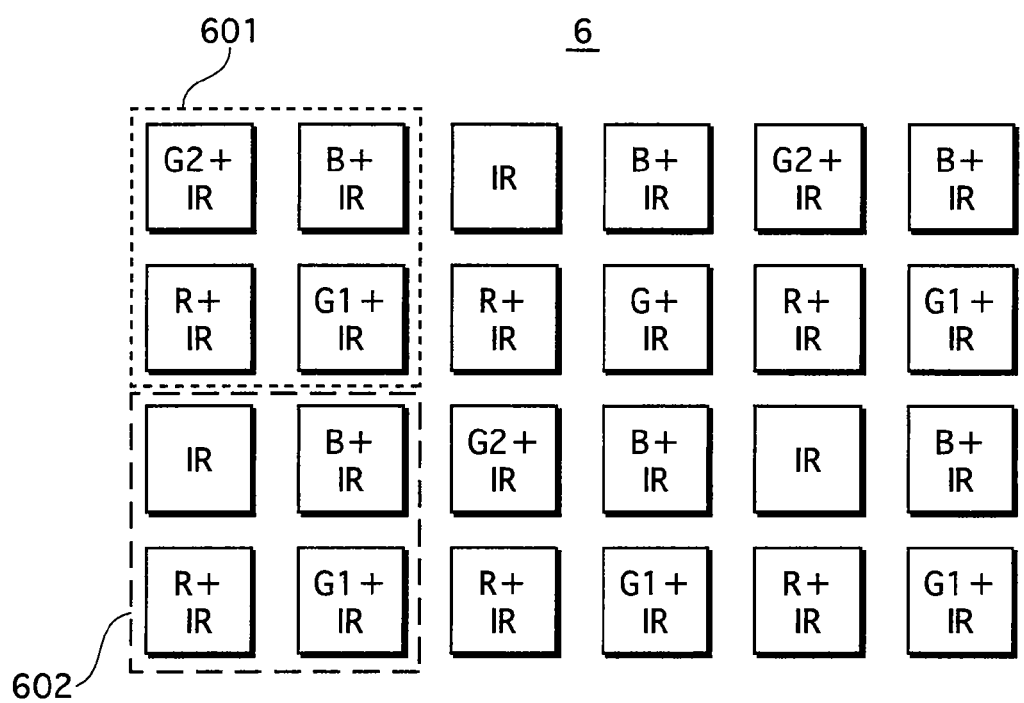
FIG. 7 shows an arrangement of filters of a solid-state imaging apparatus pertaining to a fifth embodiment of the present invention.
Figure 8:
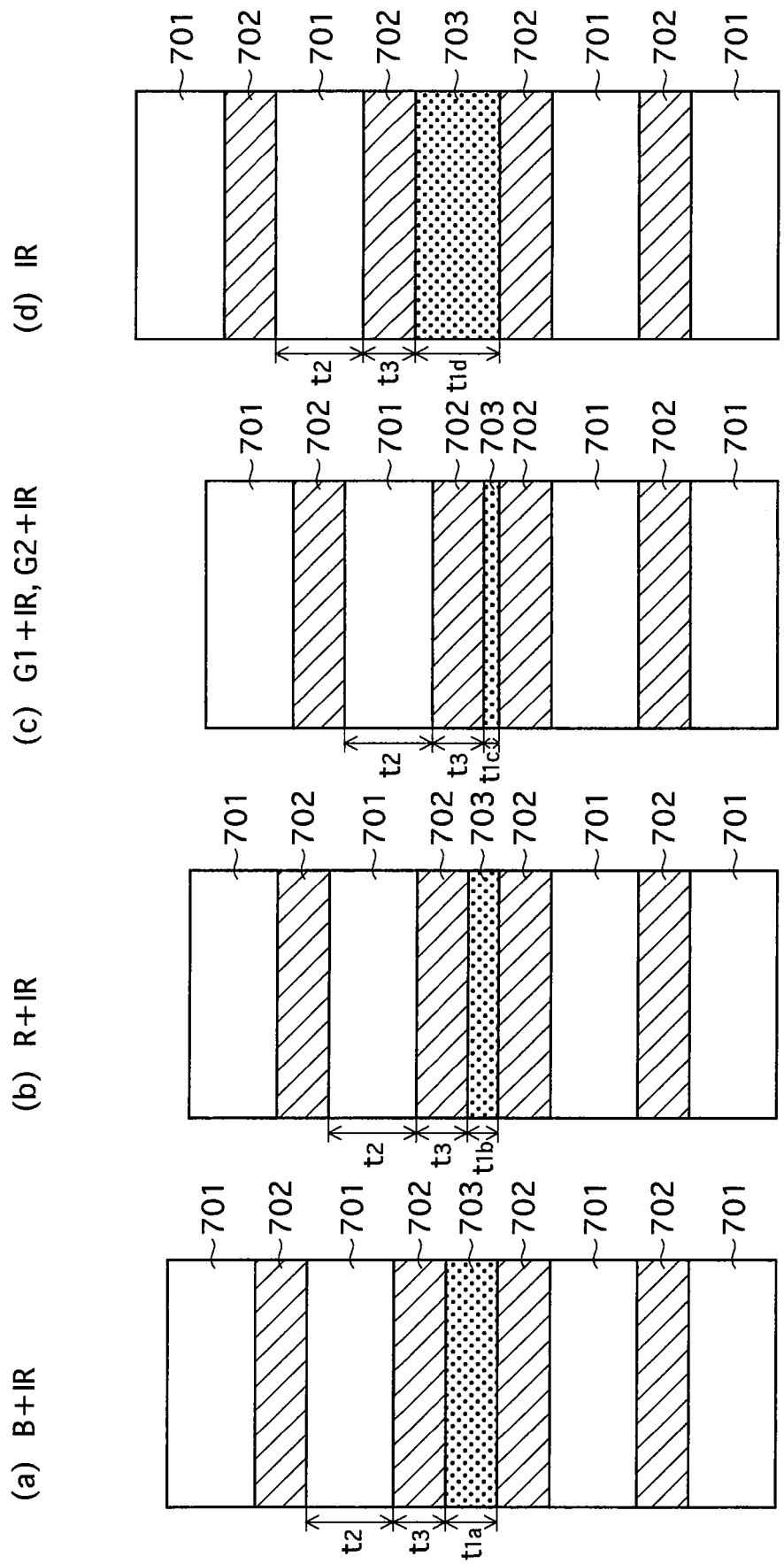
FIGS. 8A, 8B, 8C and 8D show structures of the filters pertaining to the fifth embodiment of the present invention
Figure 9:
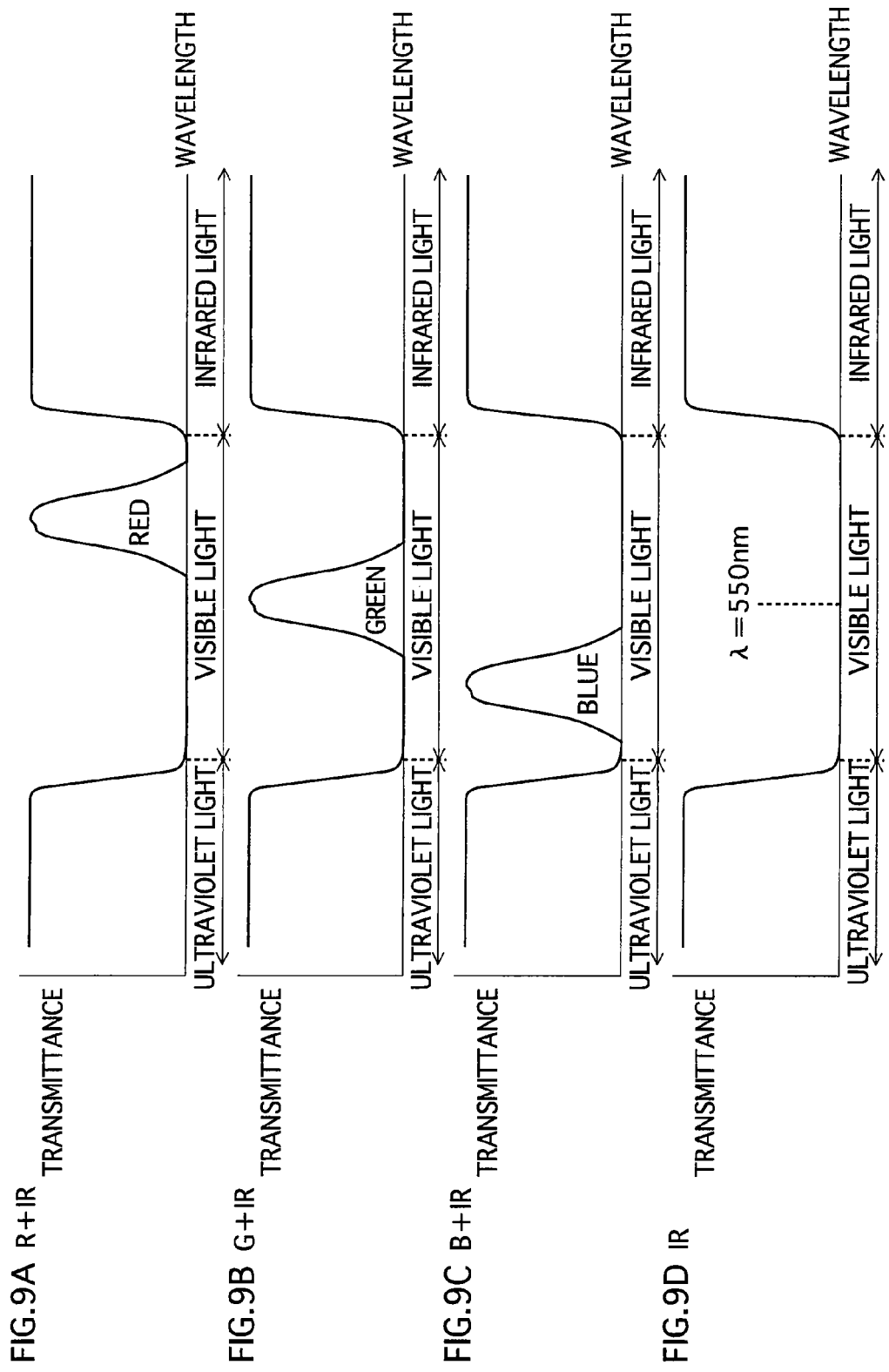
FIGS. 9A, 9B, 9C and 9D are graphs showing the spectral characteristics of the filters pertaining to the fifth embodiment of the present invention

Firstly, the arrangement of filters pertaining to the present embodiment is described. FIG. 7 shows the arrangement of filters of a solid-state imaging apparatus pertaining to the present embodiment. As shown in FIG. 7, according to the filters of a solid-state imaging apparatus 6, units of arrangement 601 and 602 are two-dimensionally arranged alternately both in the row direction and in the column direction.

In this case, four filters (a filter (G2+IR), a filter (B+IR), a filter (G1+IR) and a filter (R+IR)) are squarely arranged in the unit of arrangement 601. Here, the filter (G2+IR) transmits both green light and infrared light, the filter (B+IR) transmits both blue light and infrared light, the filter (G1+IR) transmits both green light and infrared light, the filter (R+IR) transmits both red light and infrared light.

Also, in the unit of arrangement 602, four filters (an infrared filter (IR), a filter (B+IR), a filter (G1+IR) and a filter (R+IR)) are squarely arranged. Here, the filter (B+IR) transmits both blue light and infrared light, the filter (G1+IR) transmits both green light and infrared light, and the filter (R+IR) transmits both red light and infrared light.

Thus, it is possible to decrease the number of pixels that receive only infrared light, making it possible to enhance the resolution in performing color imaging using visible light compared to the prior art. Also, it is needless to say that it is possible to enhance the resolution in performing imaging using infrared light.

(2) Structure of Filters

The structure of filters pertaining to the present embodiment is described next. FIGS. 8A, 8B, 8C and 8D show the structures of filters pertaining to the present embodiment. FIG. 8A FIG. 8B FIG. 8C and FIG. 8D show the structure of a filter (B+IR), the structure of a filter (R+IR), the structure of filters (G1+IR) and (G2+IR) and the structure of an infrared filter (IR), respectively.

As shown in FIGS. 8A, 8B, 8C and 8D, the filters are multilayer interference filters in which silicon dioxide layers 703 are sandwiched, as spacer layers, between two $\lambda/4$ multilayer films that include alternately laminated silicon dioxide ($SiO_2$) layers 701 and titanium oxide ($TiO_2$) layers 702 regardless of wavelength regions of light to be transmitted.

The silicon dioxide layers 701 and the titanium oxide layers 702 that compose the $\lambda/4$ multilayer films have the same optical thickness. The optical thickness is a value obtained by multiplying the refractive index of the material composing the layer by the physical thickness of the layer. Also, physical thicknesses t2 of the silicon dioxide layers 701 and physical thicknesses t3 of the titanium dioxide layers 702 are the same even between different filters.

On the other hand, the physical film thicknesses of the spacer layers 703 are different between filters. The physical thickness t1a of the spacer layer 703 of the filter (B+IR), the physical thickness t1b of the spacer layer 703 of the filter (R+IR) and the physical thickness t1c of the spacer layer 703 of the filters (G1+IR) and (G2+IR) are all smaller than the physical thicknesses t2 of the silicon dioxide layers 701.

Also, the size relation of the physical thicknesses of the spacer layers 703 between the filters is as follows.

$$t1c < t1b < t1a < t1d$$

Also, the physical thickness t1d of the spacer layer 703 of the infrared filter (IR) is substantially equal to the physical thicknesses t2 of the silicon dioxide layers 701.

So-called $\lambda/4$ multilayer films include two types of dielectric layers that have been alternately laminated, the dielectric layers having a same optical thickness and a different refractive index. When the optical thicknesses of the dielectric layers are $\lambda/4$, the $\lambda/4$ multilayer films reflect and intercept light in a wavelength band centered around a wavelength $\lambda$ four times the optical thickness of the layers. In order to reflect light in the wavelength band centered around a wavelength 550 nm to $\lambda/4$ multilayer films whose dielectric material of high refractive index layers and dielectric material of low refractive index layers are made using the titanium oxide and silicon oxide respectively, the physical thickness of each dielectric layer should be as follows:

Titanium dioxide layer: $550 \div 4 \div 2.51 = 54.7$nm

Silicon dioxide layer: $550 \div 4 \div 1.45 = 94.8$nm

Note that the refractive index of the titanium dioxide is 2.51 and the refractive index of the silicon dioxide is 1.45.

The wavelength 550 nm is substantially a central wavelength in the visible wavelength region. Since the $\lambda/4$ multilayer films like the above not only reflect and intercept visible light but also transmit infrared light, the above $\lambda/4$ multilayer films can be used as infrared filters. As mentioned above, since the spacer layer 703 of the infrared filters and the silicon dioxide layers 701 have the same physical thickness, the infrared filters as a whole are $\lambda/4$ multilayer films.

In the present embodiment is realized a filter that transmits infrared light and visible light in a predetermined wavelength region by the multilayer interference filter that sandwiches the spacer layer between the $\lambda/4$ multilayer films that function as infrared filters.

On the other hand, according to the filters that transmit both visible light and infrared light, the physical thicknesses of the spacer layers are smaller than the physical thicknesses of the silicon dioxide layers 701. Also, the physical thicknesses of the spacer layers are different in accordance with a wavelength region of light to be transmitted. With such physical thickness of the spacer layer, it is possible to transmit visible light of a wavelength that corresponds to the size of the physical thickness.

In this case, each of filters can transmit infrared light regardless of the size of the physical thicknesses of the spacer layers. Accordingly, it is possible to realize a filter (B+IR) that transmits both blue light and infrared light, a filter (G1+IR) that transmits both green light and infrared light and a filter (R+IR) that transmits both red light and infrared light.

(3) Spectral Characteristics of Filters

The spectral characteristics of filters pertaining to the present embodiment are described next. FIGS. 9A, 9B, 9C and 9D are graphs showing the spectral characteristics of the filters pertaining to the present embodiment. Also, FIGS. 9A, 9B, 9C and 9D show the spectral characteristics of the filters (R+IR), (G+IR), (B+IR) and the infrared filter (IR) respectively. In each of the graphs, a horizontal axis shows the wavelength of light and a vertical axis shows the transmittance at each wavelength.

As shown in FIGS. 9A, 9B, 9C and 9D, each filter has almost the same spectral characteristic outside the reflection band of the $\lambda/4$ multilayer films (i.e. in the wavelength region other than the visible wavelength region) that are composed of the silicon dioxide layers 701 and the titanium oxide layers 702. However, ultra violet light is absorbed by an exchange lens of the digital camera. Also, even if ultra violet light is incident on the camera, the photodiode does not generate a signal charge like the above.

Accordingly, other than transmitting infrared light, each filter only transmits visible light at a wavelength that corresponds to each spectral characteristic.

Also, since the photodiode detects light whose wavelength is longer than 380 nm, a problem does not arise even if the filters transmit ultra violet light. Also, ultra violet light is absorbed by the exchange lens of the camera. Therefore a problem does not arise.

(4) Method of a Signal Processing

The processing method of pixel signals obtained using the filters like the above is described next. As shown in FIGS. 9A, 9B, 9C and 9D, the filters (R+IR), (G+IR), (B+IR) and the infrared filter (IR) have substantially the same transmission characteristic for infrared light. Focusing on this point makes it possible to obtain a pixel signal of each color by the following equations.

Red signal=(R+IR) signal−IR signal

Green signal=(G+IR) signal−IR signal

Blue signal=(B+IR) signal−IR signal

Here, the (R+IR) signal, the (G+IR) signal and the (B+IR) signal are pixel signals outputted by pixels having the filters (R+IR), (G+IR) and (B+IR). Also, the IR signal is a pixel signal outputted by a pixel having the infrared filter (IR). The above subtractions are performed between pixels arranged closest to one another.

Thus, it is possible to obtain a pixel signal in each wavelength region without undergoing complex operations like the prior art. Also, it is possible to enhance the resolution both in performing color imaging using visible light and in performing imaging using infrared light.

[6] Modifications

Hereinbefore, the present invention is described based on the embodiments. However, it is needless to say that the present invention is not limited to the above embodiments. Therefore, it is possible to implement the following modifications.

(1) In the above fifth embodiment, the description is given entirely of the solid-state imaging apparatus 112 pertaining to the first embodiment whose filters (R), (G) and (B) are replaced with filters (R+IR), (G+IR) and (B+IR) that even transmit infrared light. However, it is needless to say that the present invention is not limited to this. Therefore, instead of the above, filters (R), (G) and (B) arranged like other embodiments may be replaced with filters (R+IR), (G+IR) and (B+IR) that also transmit infrared light.

Figure 10:
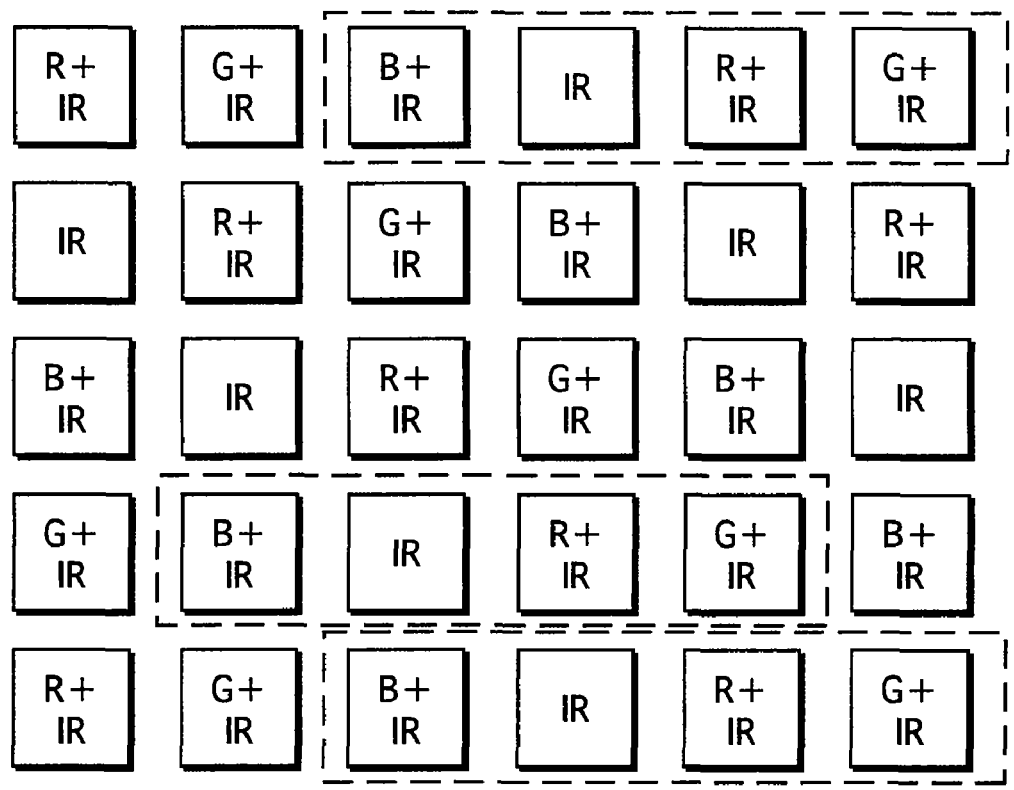
FIG. 10 shows an arrangement of filters of a solid-state imaging apparatus pertaining to a modification (1) of the present invention.

FIG. 10 shows the arrangement of filters of a solid-state imaging apparatus pertaining to the present modification. As shown in FIG. 10, it is possible to obtain effects of both the third embodiment and the fifth embodiment by replacing the filters (R), (G) and (B) arranged like the third embodiment with the filters (R+IR), (G+IR) and (B+IR) that even transmit infrared light.

That is it is possible to perform color imaging using visible light and imaging using infrared light at high resolution.

(2) Although not particularly mentioned in the above embodiments, interchanging the row direction of the arrangement and column direction thereof pertaining to the above embodiments does not change the effect of the present invention.

(3) According to the above third embodiment, the description is entirely given of the case where rows of arranged filters that is adjacent to each other are displaced one pixel from each other. However, it is needless to say that the present invention is not limited to this. Therefore, instead of this arrangement, the following arrangement is possible.

Figure 11:
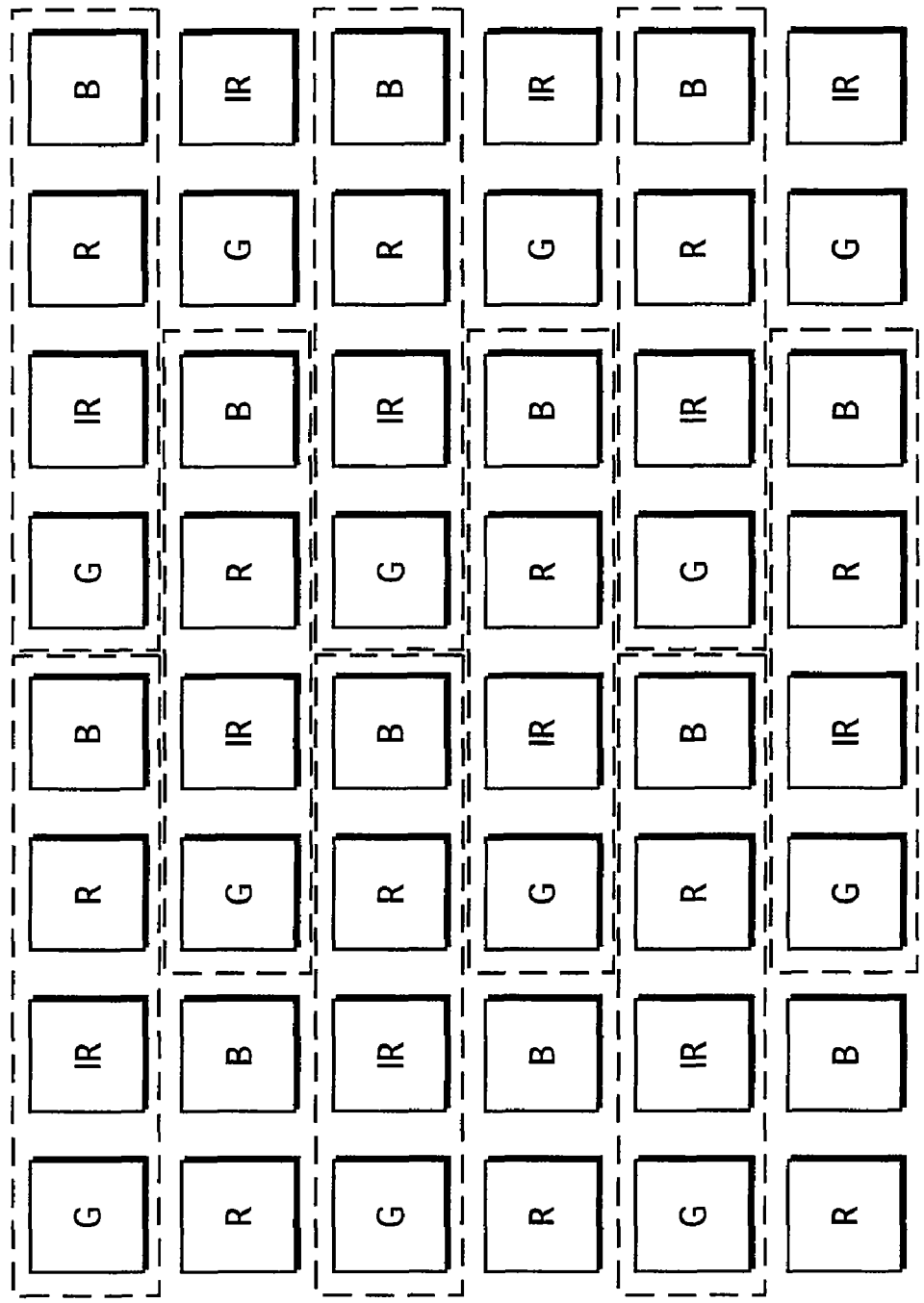
FIG. 11 shows an arrangement of filters of a solid-state imaging apparatus pertaining to a modification (3) of the present invention.

FIG. 11 shows the arrangement of filters of the solid-state imaging apparatus pertaining to the present embodiment. As shown in FIG. 11, sets of the filters arranged in the order of (G), (IR), (R) and (B) in the row direction are arranged such that the sets of filters that is adjacent to each another in the column direction are displaced two pixels from each other.

Thus, since the pixels that image an infrared light are not adjacent to each other even in a diagonal direction, it is possible to suppress the deterioration in resolution in performing color imaging using visible light. Even in this case, it is possible to obtain the same effect even if the row direction and the column direction are interchanged.

(4) Although not particularly mentioned in the above embodiments, a filter can be obtained that does not transmit infrared light but transmits visible light in a predetermined wavelength by the following procedure.

That is it is possible to obtain an infrared reflective coating that reflects light in a wavelength region centered around 850 nm, using a $\lambda/4$ multilayer film whose layers each having an optical thickness of $\frac{1}{4}$ of 850 nm which is a near-infrared wavelength. Accordingly, arranging such infrared reflective coating in addition to a filter that mainly transmits visible light in a predetermined wavelength makes it possible to allow only visible light in a predetermined wavelength to be incident on a photodiode.

Accordingly, it is possible to obtain filters (R), (G) and (B) in the above embodiment by combining the filters (R+IR), (G+IR), (G+IR) and (B+IR) with the infrared reflective coating.

Also, it is needless to say that the effect of the present invention is the same even if filters (R), (G) and (B) are realized by other structures.

(5) In the above embodiments, although the description is given of the case where the transmittance is 0% in a wavelength region other than a desired wavelength region as shown in FIGS. 9A, 9B, 9C and 9D, it is needless to say that the present invention is not limited to this. Therefore, even if the transmittance in the wavelength region other than the desired wavelength region is more than 0%, it is possible to achieve the same effect.

For example, as shown in FIGS. 8A, 8B, 8C and 8D, when the number of multilayer interface filters (i.e. the number of layers of the $\lambda/4$ multilayer films) is comparatively small, the transmittance in the wavelength region other than a desired wavelength region is about 0% to 30%. In such case, although it is not possible to obtain ideal color reproducibility for an image obtained after a signal processing has been performed on a camera, the effect of the present invention does not change.

The solid-state imaging apparatus, the signal processing method and the camera that pertain to the present invention are especially useful for technology that performs color imaging using visible light and imaging using infrared light at high resolution.

The invention claimed is:

1. A solid-state imaging apparatus that performs color imaging using visible light and imaging using infrared light, the solid-state imaging apparatus including a plurality of two-dimensionally arranged pixel cells, in each of which a filter mainly transmits one of visible light and infrared light, wherein:

arrangement of the filters is a combination of (i) a first unit of arrangement where a plurality of filters that mainly transmit visible light are arranged and (ii) a second unit of arrangement where a filter that mainly transmits visible light and a filter that mainly transmits infrared light are arranged, a multilayer interface filter that composes each of the filters that mainly transmit visible light includes two $\lambda/4$ multilayer films and a dielectric layer sandwiched therebetween, the dielectric layer having an optical film thickness different from an optical film thickness of each layer that composes the λ/4 multilayer films, and each of (i) the two λ/4 multilayer films that are included in each of the filters that mainly transmits visible light and (ii) a λ/4 multilayer film that composes the filter that mainly transmits infrared light includes two types of dielectric layers that have been alternately laminated, each type of dielectric layers being composed of inorganic materials, and having a same optical thickness and a different refractive index from each other.

2. The solid-state imaging apparatus of claim 1, wherein the filter that mainly transmits visible light also transmits infrared light together with visible light.

3. A camera having the solid-state imaging apparatus of claim 1.

4. A solid-state imaging apparatus that performs color imaging using visible light and imaging using infrared light, the solid-state imaging apparatus including a plurality of two-dimensionally arranged pixel cells, in each of which a filter mainly transmits one of visible light and infrared light, wherein:

the filters are arranged such that units of arrangement, each of which has filters including at least a filter that mainly transmits green visible light and a filter that mainly transmits infrared light, are two-dimensionally arranged, the filter that mainly transmits green visible light and the filter that mainly transmits infrared light are adjacent to each other in one of a row direction and a column direction, a multilayer interface filter that composes each of the filters that mainly transmit visible light includes two λ/4 multilayer films and a dielectric layer sandwiched therebetween, the dielectric layer having an optical film thickness different from an optical film thickness of each layer that composes the λ/4 multilayer films, and each of (i) the two λ/4 multilayer films that are included in each of the filters that mainly transmits visible light and (ii) a λ/4 multilayer film that composes the filter that mainly transmits infrared light includes two types of dielectric layers that have been alternately laminated, each type of dielectric layers being composed of inorganic materials, and having a same optical thickness and a different refractive index from each other.

5. The solid-state imaging apparatus of claim 4, wherein the filter that mainly transmits visible light also transmits infrared light together with visible light.

6. A camera having the solid-state imaging apparatus of claim 4.

7. A solid-state imaging apparatus that performs color imaging using visible light and imaging using infrared light, the solid-state imaging apparatus including a plurality of two-dimensionally arranged pixel cells, in each of which a filter mainly transmits one of visible light and infrared light, wherein:

the filters are arranged such that units of arrangement, in each of which a plurality of kinds of filters that mainly transmit one of visible light and infrared light are one dimensionally arranged, are two-dimensionally arranged, filters that mainly transmit infrared light are not adjacent to each other either in a row direction or in a column direction, a multilayer interface filter that composes each of the filters that mainly transmit visible light includes two λ/4 multilayer films and a dielectric layer sandwiched therebetween, the dielectric layer having an optical film thickness different from an optical film thickness of each layer that composes the λ/4 multilayer films, and each of (i) the two λ/4 multilayer films that are included in each of the filters that mainly transmits visible light and (ii) a λ/4 multilayer film that composes the filter that mainly transmits infrared light includes two types of dielectric layers that have been alternately laminated, each type of dielectric layers being composed of inorganic materials, and having a same optical thickness and a different refractive index from each other.

8. The solid-state imaging apparatus of claim 7, wherein the filters that mainly transmit infrared light are not adjacent to each other in a diagonal direction.

9. The solid-state imaging apparatus of claim 7, wherein in the units of arrangement, four kinds of filters that mainly transmit one of red light, green light, blue light and infrared light are arranged.

10. The solid-state imaging apparatus of claim 7, wherein in the units of arrangement, five kinds of filters that mainly transmit one of cyan light, magenta light, yellow light, green light and infrared light are arranged.

11. The solid-state imaging apparatus of claim 7, wherein the filter that mainly transmits visible light also transmits infrared light together with visible light.

12. A camera having the solid-state imaging apparatus of claim 7.

13. A solid-state imaging apparatus that performs color imaging using visible light and imaging using infrared light, the solid-state imaging apparatus including a plurality of two-dimensionally arranged pixel cells, in each of which a filter mainly transmits one of visible light and infrared light, wherein:

arrangement of the filters is a combination of (i) a first unit of arrangement where filters including at least a filter that mainly transmits green visible light and a filter that mainly transmits infrared light are squarely arranged and (ii) a second unit of arrangement where filters including at least a filter that mainly transmits green visible light and a filter that mainly transmits infrared light are arranged differently from the first unit of arrangement, a multilayer interface filter that composes each of the filters that mainly transmit visible light includes two λ/4 multilayer films and a dielectric layer sandwiched therebetween, the dielectric layer having an optical film thickness different from an optical film thickness of each layer that composes the λ/4 multilayer films, and each of (i) the two λ/4 multilayer films that are included in each of the filters that mainly transmits visible light and (ii) a λ/4 multilayer film that composes the filter that mainly transmits infrared light includes two types of dielectric layers that have been alternately laminated, each type of dielectric layers being composed of inorganic materials, and having a same optical thickness and a different refractive index from each other.

14. The solid-state imaging apparatus of claim 13, wherein the filter that mainly transmits visible light also transmits infrared light together with visible light.

15. A camera having the solid-state imaging apparatus of claim 13.

* * * * *